United States Patent
Muller

(10) Patent No.: US 11,328,891 B2
(45) Date of Patent: May 10, 2022

(54) ROTATING-ANODE BEARING AND A ROTATING ANODE FOR AN X-RAY TUBE AND A METHOD FOR MANUFACTURING A ROTATING-ANODE BEARING FOR AN X-RAY TUBE

(71) Applicant: MINEBEA MITSUMI INC., Nagano (JP)

(72) Inventor: Peter Andreas Muller, Leutkirch (DE)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/691,567

(22) Filed: Nov. 21, 2019

(65) Prior Publication Data
US 2020/0168425 A1 May 28, 2020

(30) Foreign Application Priority Data
Nov. 23, 2018 (DE) .......................... 102018220108.0

(51) Int. Cl.
*H01J 35/10* (2006.01)
*B21J 1/04* (2006.01)
(Continued)

(52) U.S. Cl.
CPC ............. *H01J 35/1017* (2019.05); *B21J 1/04* (2013.01); *B23P 15/003* (2013.01);
(Continued)

(58) Field of Classification Search
CPC ..... H05G 1/02; A61B 6/40; A61B 6/44; H01J 35/00; H01J 35/02; H01J 35/04;
(Continued)

(56) References Cited

U.S. PATENT DOCUMENTS 3,927,450 A * 12/1975 Sommer ................. F16C 33/64
29/898.066
5,851,313 A * 12/1998 Milam ..................... C23G 5/00
148/222
(Continued)

FOREIGN PATENT DOCUMENTS

AT          231581 B      2/1964
DE    102015220101 A1    4/2017
(Continued)

OTHER PUBLICATIONS

Examination report received for DE Application No. 102018220108, dated Aug. 8, 2019, 7 pages (Original Document Only).

*Primary Examiner* — Anastasia Midkiff
(74) *Attorney, Agent, or Firm* — Faegre Drinker Biddle & Reath LLP

(57) ABSTRACT

The disclosure relates to a rotating-anode bearing for an X-ray tube
  comprising a rotor shaft extending along a longitudinal axis from a first axial end to a second axial end and supported to be rotatable about the longitudinal axis; wherein
  the rotor shaft has an anode holder in the area of the first axial end; and
  the anode holder comprises a flange which has a larger diameter than at least an adjacent section of the rotor shaft.
The rotating-anode bearing according to the disclosure wherein the rotor shaft together with the flange is made as an integrally forged part.

20 Claims, 3 Drawing Sheets

(51) Int. Cl.
*F16C 33/64* (2006.01)
*B23P 15/00* (2006.01)
*F16C 33/58* (2006.01)

(52) U.S. Cl.
CPC ............ *F16C 33/581* (2013.01); *F16C 33/64* (2013.01); *H01J 35/10* (2013.01); *H01J 35/108* (2013.01); *H01J 35/1024* (2019.05); *H01J 2235/08* (2013.01); *H01J 2235/102* (2013.01); *H01J 2235/1026* (2013.01)

(58) Field of Classification Search
CPC .......... H01J 35/08; H01J 35/10; H01J 35/101; H01J 35/1017; H01J 35/1024; H01J 35/108; H01J 2235/00; H01J 2235/08; H01J 2235/081; H01J 2235/083; H01J 2235/10; H01J 2235/1006; H01J 2235/102; H01J 2235/1046; H01J 2235/1053; B23P 9/00; B23P 15/003; B23P 2700/00; B23P 2700/02; B21J 1/04; B21J 5/00; B21J 5/002; B21J 5/10; B21J 5/12; F16C 3/00; F16C 3/02; F16C 19/00; F16C 19/02; F16C 19/10; F16C 19/14; F16C 19/18; F16C 33/58; F16C 33/581; F16C 33/64; F16C 2204/60; F16C 2204/66; F16C 2204/70; F16C 2204/72; F16C 2204/74

See application file for complete search history.

(56) References Cited

U.S. PATENT DOCUMENTS

| 6,088,426 | A  | * | 7/2000 | Miller | H01J 35/10 |
| | | | | | 378/121 |
| 6,440,237 | B1 | * | 8/2002 | Skilling | B23P 15/003 |
| | | | | | 148/649 |
| 6,819,742 | B1 | * | 11/2004 | Miller | H01J 35/101 |
| | | | | | 378/144 |
| 7,184,520 | B1 | * | 2/2007 | Sano | H01J 35/1017 |
| | | | | | 378/125 |
| 2010/0260323 | A1 | * | 10/2010 | Legall | H01J 35/107 |
| | | | | | 378/125 |
| 2018/0061611 | A1 | * | 3/2018 | McCabe | H01J 35/1017 |

FOREIGN PATENT DOCUMENTS

| DE | 102017122122 A1 | 3/2018 |
| DE | 102016223964 A1 | 6/2018 |

* cited by examiner

ROTATING-ANODE BEARING AND A ROTATING ANODE FOR AN X-RAY TUBE AND A METHOD FOR MANUFACTURING A ROTATING-ANODE BEARING FOR AN X-RAY TUBE

CROSS-REFERENCE TO RELATED APPLICATION

The present application is a U.S. nonprovisional application which claims priority to DE 102018220108.0, filed Nov. 23, 2018, the entire disclosures of which is hereby expressly incorporated herein by reference.

The present disclosure relates to a rotating-anode bearing for an X-ray tube, a rotating anode with a corresponding rotating-anode bearing and a method for manufacturing a rotating-anode bearing for an X-ray tube.

BACKGROUND/SUMMARY

A generic rotating-anode bearing is, for example, disclosed in DE 10 2015 220 101 A1. This comprises a rotor shaft, comprising an anode holder in the area of a first axial end, the anode holder being formed by a flange. The flange has a considerably larger diameter than the rest of the rotor shaft, i.e. than all other sections of the rotor shaft. Conventionally, such a rotor shaft is made from a rod-like material in a machining process. In principle such rotor shafts can also be made as welded structures.

Such generic rotating-anode bearings are exposed to considerable loads due to the high rotational speeds and the fast rotation of the rotating anodes about the scanner axis in an X-ray tube of a CT scanner. These high loads can reduce the service life of such rotating-anode bearings.

It is the object of the present disclosure to provide a rotating-anode bearing as well as a manufacturing method for such a rotating-anode bearing, which has a particularly long service life.

The object of the disclosure is achieved by a rotating-anode bearing having the features described herein and a method for manufacturing a rotating-anode bearing having the features described herein. The dependent claims describe advantageous and particularly suitable configurations of the disclosure, as well as a rotating anode with a rotating-anode bearing according to the disclosure.

An inventive rotating-anode bearing for an X-ray tube comprises a rotor shaft extending along a longitudinal axis from a first axial end to a second axial end and supported to be rotatable about the longitudinal axis. An anode holder is provided in the area of the first axial end of the rotor shaft.

The anode holder comprises a flange which has a larger diameter than at least one adjacent section of the rotor shaft. The flange can be provided directly at the first axial end of the rotor shaft or at a distance from the end, in which case a shaft journal is connected to the first end.

According to the disclosure, the rotor shaft together with the flange is made as an integrally forged part.

The disclosure is based on the knowledge that in the manufacturing process of rotor shafts to date, the comparatively large material volume removed by machining has a negative influence on the structural stability of the material of the rotor shaft. The grain flow within the material is thus interrupted by the machining process. The inventive forging process, on the other hand, dispenses with this interruption of the grain flow. On the contrary, strengthening of the material of the rotor shaft can even be achieved by the forging process, although according to an exemplary embodiment of the disclosure, forging is followed by austenitisation of the rotor shaft, whereby the material strengthening achieved during forging is largely or even completely reversed. Nevertheless, the rotor retains long-term strength properties that are superior to those of the existing manufacturing process, due at least to the absence of any interruption in the grain flow.

A further advantage of the inventive manufacturing method of the rotor shaft is that material can be saved depending on the diameter of the flange as compared to the rest of the rotor shaft.

The rotor shaft is preferably made of high temperature resistant tool steel. the rotor shaft can, for example, be made by forging high-alloy stainless steel, in particular hot work tool steels, such as X32 CrMoV 3 3, X38 CrMoV 5 1, X40 CrMoV 5 1, Thermodur® EFS 2343/2344/2365/2367/2999 EFS or Thermodur® E 38K.

The flange can form the greatest diameter of the rotor shaft. According to an embodiment of the disclosure, apart from the flange, or a transition area to the flange, the rotor shaft has an at least substantially constant diameter.

For example, the diameter of the flange is at least twice the diameter of the adjacent section of the rotor shaft or of all other sections of the rotor shaft.

In the area of the first axial end and in the area of the second axial end at least one antifriction bearing can be provided, and the rotor shaft forms a bearing inner ring of the antifriction bearings on which rolling elements of the antifriction bearing roll. Alternatively, either one common or separate bearing inner rings can be mounted on the rotor shaft.

In particular, if the rotor shaft itself forms the bearing inner rings, the surface of the rotor shaft is preferably hardened at least in the area of tracks of the rolling elements or overall.

According to an embodiment of the disclosure, the rotor shaft is only hardened on its surface. A further embodiment provides that the rotor shaft is hardened from its surface to its core.

In order to achieve an improved toughness of the rotor shaft, it is preferably austenitized, at least in an inner core or overall. Accordingly, the rotor shaft will exhibit an austenitic microstructure in the core or overall. Hardening can be carried out subsequently, if required.

According to an alternative embodiment, hardening of the rotor shaft can be carried out by austenitizing in combination with quenching, whereby the rotor shaft is through-hardened.

An inventive rotating anode for an X-ray tube comprises a rotor and a stator enclosing the rotor at a distance in the circumferential direction, wherein the rotor and the stator interact electromagnetically with each other, in such a manner that the rotor can be made to rotate by applying an electromagnetic field by means of the stator, wherein the rotor has a cup-shaped configuration, encloses an antifriction-borne rotor shaft in the circumferential direction and is coupled to a first axial end of the rotor shaft. An anode disc is further provided that is coupled to an axial end of the rotor and is provided with anode material, wherein the anode disc is coupled to the rotor shaft in the area of the first axial end and/or to the rotor. If the anode disc is coupled to the rotor, the rotor can be attached to the flange of the rotor shaft. If the anode disc is connected directly to the rotor shaft, the anode disc can be coupled to the flange. The flange can also form the anode disc itself.

The rotor shaft is supported by means of a rotating-anode bearing of the type shown, in a stationary housing which is enclosed by the stator.

Both the rotor and the stationary housing, or parts of the stationary housing, are advantageously located inside a vacuum envelope, made of glass for example.

During operation of the X-ray tube, the anode material on the anode disc connected to the anode holder can be hit by electrons from a cathode associated with the anode, thereby generating the desired X-ray radiation. The cathode and the rotating anode can be positioned opposite each other in the aforementioned vacuum envelope, in particular in the axial direction. The stator, on the other hand, can be positioned outside the vacuum envelope.

According to the inventive method for manufacturing a rotating-anode bearing for an X-ray tube, wherein the rotating-anode bearing comprises a rotor shaft extending along a longitudinal axis from a first axial end to a second axial end and supported to be rotatable about the longitudinal axis, and the rotor shaft comprises an anode holder in the area of the first axial end, the rotor shaft together with a flange, in the area of the first axial end, is integrally formed by forging.

The rotor shaft 3 with the flange can, for example, be forged from a rod-like billet 25 with an outer diameter larger than the outer diameter of the finished rotor shaft in the area of the second axial end, as shown schematically in FIG. 3. Preferably, the outer diameter of the rod-like billet is a maximum of 10%, 15% or 20% larger than the outer diameter of the finished rotor shaft in the area of the second axial end. This results in favorable deformation of the material.

Preferably the rotor shaft with the flange is austenitized after forging.

As shown, the rotor shaft can also be hardened in part or overall.

Following manufacture of the rotor shaft together with the flange by means of forging, and in particular before hardening, the rotor shaft together with the flange can additionally be machined, for example to ensure that the rotor shaft and optionally a transition section has a constant outer diameter outside the flange, and/or in order to introduce holes, in particular axial holes, or the like.

The inventive method thus enables the diameter of the flange to be formed by means of upsetting from a material having a comparatively smaller diameter, which has a particularly favorable effect on strength properties while at the same time saving material.

The disclosure will be described in the following on the basis of exemplary embodiments and the figures.

DETAILED DESCRIPTION

Figure 1:
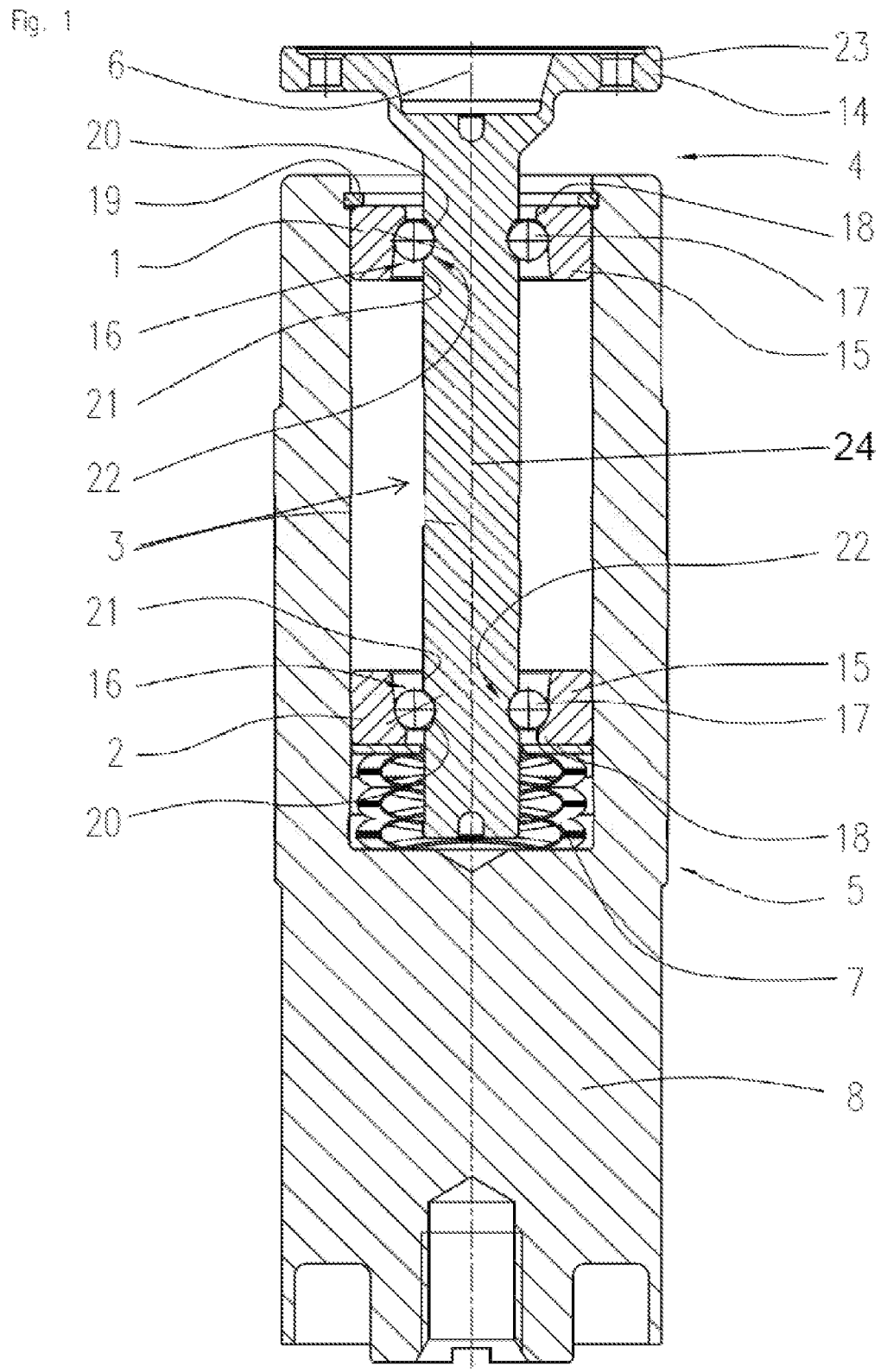
FIG. 1 shows an exemplary embodiment of a rotating-anode bearing.

The rotating-anode bearing for an X-ray tube according to FIG. 1 comprises a rotor shaft 3 supported on a first antifriction bearing 1 and a second antifriction bearing 2. The rotor shaft 3 extends from a first axial end 4 to a second axial end 5 along the longitudinal axis 6 about which the rotor shaft 3 rotates. The rotor shaft 3 is supported in the area of the first axial end 4 by the first antifriction bearing 1 and is supported in the area of the second axial end 5 by the second antifriction bearing 2, wherein in the example shown, both axial ends 4, 5 each project beyond the corresponding antifriction bearing 1, 2.

At its first axial end 4, the rotor shaft 3 carries an anode holder 14 to which an anode disc and, if required, a rotor can be mounted, as described below with reference to FIG. 2.

In the area of the second axial end 5, the rotor shaft 3 is enclosed axially by a spring element 7 outside the second antifriction bearing 2, which is resiliently supported on the one hand against a stationary housing 8, in which the rotor shaft 3 is supported to be rotated about the longitudinal axis 6, and on the other hand against a bearing outer ring 15 of the second antifriction bearing 2. The spring element 7 presses the bearing outer ring 15 of the second antifriction bearing 2 elastically in the direction towards the bearing outer ring 15 of the first antifriction bearing 1. In particular, as shown, a washer or the like can be provided between the bearing outer ring 15 of the second antifriction bearing 2 and the spring element 7 to support the spring element 7 on the bearing outer ring 15.

The supporting force of the spring element 7 is transmitted in the direction of the longitudinal axis 6 to the rotor shaft 3 via the bearing outer ring 15 of the second antifriction bearing 2 and the rolling elements 17 of the rolling element row 16 of the second antifriction bearing 2. For this purpose, the bearing outer ring 15 of the second antifriction bearing 2 has a bearing outer ring shoulder 18 which projects radially inwardly from the bearing outer ring 15 and engages the rolling elements 17 in the axial direction, i.e. in the direction of the longitudinal axis 6. The bearing outer ring shoulder 18 is located on the side of the rolling element row 16 of the second antifriction bearing 2 facing the spring element 7.

The rolling elements 17 of the second antifriction bearing 2 are accommodated in a circumferential groove 20 in the radial outer surface of the rotor shaft 3, which forms the bearing inner ring 22 or radially inner tracks for the rolling elements 17. In this way, the bearing inner ring 22 or the rotor shaft 3 forms a bearing inner ring shoulder 21 via which the rolling elements 17 transmit the force of the spring element 7 in the direction of the longitudinal axis 6 in the rotor shaft 3 in the direction towards the first antifriction bearing 1. In the area of the first antifriction bearing 1, the rotor shaft 3 comprises a corresponding circumferential groove 20 which forms a bearing inner ring shoulder 21 via which the force of the spring element 7 is transmitted in the direction of the longitudinal axis 6 away from the second antifriction bearing 2 to the rolling elements 17 of the rolling element row 16 of the first antifriction bearing 1. Accordingly, the two bearing inner ring shoulders 21 of the two antifriction bearings 1, 2 are positioned axially inwardly of the two rolling element rows 16.

The force is transmitted further from the rolling elements 17 of the first antifriction bearing 1 in the direction of the longitudinal axis 6 to the bearing outer ring 15 of the first antifriction bearing 1. For this purpose, this bearing outer ring 15 has a bearing outer ring shoulder 18 which is located on the side of the rolling element row 16 of the first antifriction bearing 1 facing away from the second antifriction bearing 2 and accordingly protrudes radially inwardly from the bearing outer ring 15. Finally, the axial force of the spring element 7 is transmitted from this bearing outer ring 15 to the stationary housing 8 by means of a circlip 19, which is inserted in the stationary housing 8 and against which the bearing outer ring 15 of the first antifriction bearing 1 abuts in the direction of the longitudinal axis 6. It goes without saying that a different type of axial stop could also be provided in the stationary housing 8.

With the preferred but by no means obligatory configuration shown here, the entire spring force of the spring element 7 is transmitted via the bearing inner rings 22, here formed by the rotor shaft 3. There is no need for an element to transmit this axial force in the axial direction between the two bearing outer rings 15. This enables cost-effective and particularly backlash-free tensioning of the rotating-anode bearing.

However, as an alternative to the configuration shown here, separate bearing inner rings 22 could also be provided, which are mounted, e.g. shrunk, on the outer circumference of rotor shaft 3.

According to the disclosure, the rotor shaft 3 together with the flange 23, which forms the anode holder 14, is manufactured as an integral forged part. The forging process can be followed by a machining process to form the exemplary recesses and holes shown here in rotor shaft 3. Furthermore, the rotor shaft 3 is preferably hardened at least on its surface, at least in the area of the tracks of the rolling elements 17, in this case in the area of the circumferential grooves 20.

At least in an inner core 24, the rotor shaft 3 can exhibit an austenitic structure, which is achieved by austenitizing the forged part.

Alternatively, the rotor shaft 3 can also be through-hardened.

The billet from which the rotor shaft 3 together with the flange 23 is forged has a maximum diameter which is, in particular, only slightly or not larger than the diameter of the rotor shaft 3 in the area of the second axial end 5 to the area of the first axial end 4 before the transition to the flange 23 is provided.

Figure 2:
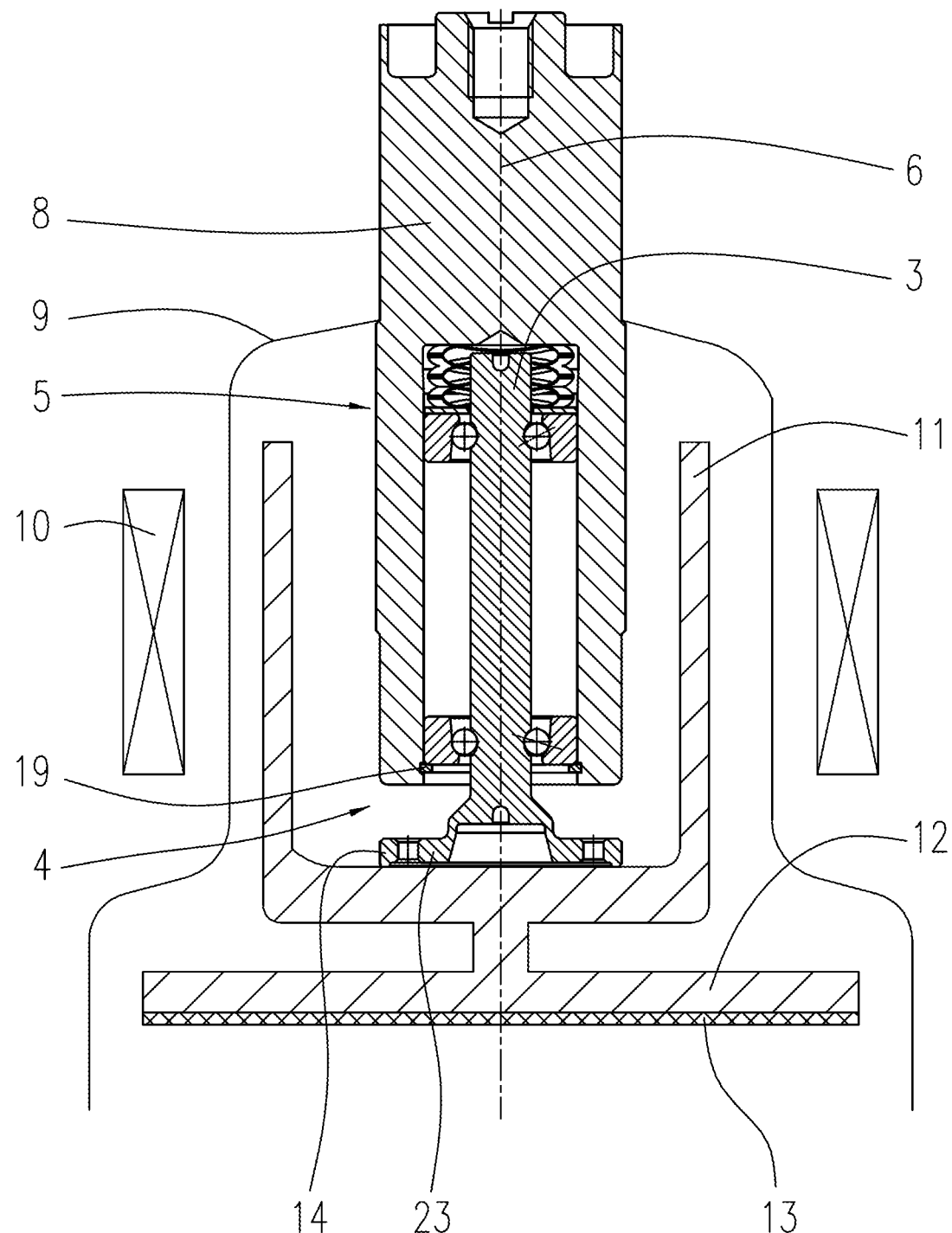
FIG. 2 shows an exemplary embodiment of an inventive rotating anode.
Figure 3:
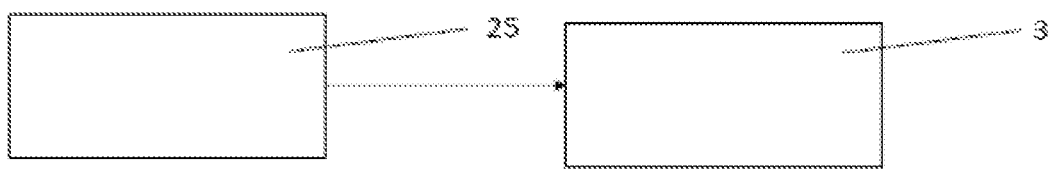
FIG. 3 schematically shows an exemplary rotor shaft forged from a rod-like billet.

FIG. 2 shows an example of a rotating anode according to the disclosure, comprising a rotating-anode bearing according to FIG. 1. The rotor shaft 3 is supported to be rotated about its longitudinal axis 6 within a stationary housing 8. The stationary housing 8 in turn carries, or is hermetically coupled to, a vacuum envelope 9 which encloses not only the rotating anode but also a cathode not shown here.

A stator 10 is provided outside the vacuum envelope 9, by means of which the rotor 11, mounted at the first axial end 4 overhung on the rotor shaft 3, namely coupled to the flange 23, can be driven in a contact-free manner through the wall of the vacuum envelope 9 so that it rotates about the longitudinal axis 6. At its first axial end 4, the rotor shaft 3 also carries the anode disc 12, which is provided with an anode material 13 and rotates with the rotor 11 or the rotor shaft 3. The anode material 13 is hit by an electron beam from the cathode not shown here, thus generating the X-ray radiation that is emitted from the vacuum envelope 9.

The anode holder 14 for holding the anode disc 12 or in this case also the rotor 11 is only shown schematically as an axial flange, but could in principle also be formed by a radial flange with a radial connection of the rotor 11.

LIST OF REFERENCE NUMERALS 1 first antifriction bearing
2 second antifriction bearing
3 rotor shaft
4 first axial end
5 second axial end
6 longitudinal axis
7 spring element
8 stationary housing
9 vacuum envelope
10 stator
11 rotor
12 anode disc
13 anode material
14 anode holder
15 bearing outer ring
16 rolling element row
17 rolling element
18 bearing outer ring shoulder
19 circlip
20 circumferential groove
21 bearing inner ring shoulder
22 bearing inner ring
23 flange

The invention claimed is:

1. A rotary support of a rotary anode for an X-ray tube comprising a rotor shaft extending along a longitudinal axis from a first axial end to a second axial end and supported to be rotatable about the longitudinal axis; wherein the rotor shaft has an anode holder in the area of the first axial end; and the anode holder comprises a flange which has a larger diameter than at least an adjacent section of the rotor shaft;

wherein the rotor shaft together with the flange is made as an integrally forged part.

2. The rotary support of a rotary anode for an X-ray tube according to claim 1, wherein the flange forms the greatest diameter of the rotor shaft.

3. The rotary support of a rotary anode for an X-ray tube according to claim 2, wherein the diameter of the flange is at least 1.2 times the diameter of the adjacent section of the rotor shaft.

4. The rotary support of a rotary anode for an X-ray tube according to claim 1, wherein in each of the area of the first axial end and the area of the second axial end at least one antifriction bearing is provided and the rotor shaft forms a bearing inner ring of the antifriction bearings including an area on which rolling elements of the antifriction bearings roll; and a surface of the rotor shaft is hardened at least in the area on which rolling elements of the antifriction bearings roll.

5. The rotary support of a rotary anode for an X-ray tube according to claim 1, wherein the rotor shaft is austenitized, or through-hardened by austenitizing in combination with quenching, at least in an inner core.

6. The rotary support of a rotary anode of any of claims 1-5 in combination with:

a rotor and a stator enclosing the rotor at a distance in the circumferential direction, wherein the rotor and the stator interact electromagnetically with each other, in such a manner that the rotor can be made to rotate by applying an electromagnetic field by means of the stator, wherein the rotor has a cup-shaped configuration, encloses the rotor shaft in the circumferential direction and is coupled to a first axial end of the rotor shaft;

an anode disc, provided with anode material, coupled to a first axial end of the rotor shaft and/or to the rotor; and a stationary housing which is enclosed by the stator, wherein the anode disc is coupled to the rotor shaft.

7. A method for manufacturing a rotating-anode bearing for an X-ray tube, comprising a rotor shaft extending along a longitudinal axis from a first axial end to a second axial end and supported to be rotatable about the longitudinal axis and having, in the area of the first axial end, an anode holder comprising a flange, comprising:

integrally forging the rotor shaft together with the flange.

8. The method according to claim 7, wherein the step of integrally forging the rotor shaft together with the flange comprising the step of integrally forging the rotor shaft together with the flange from a rod-like billet having an outer diameter that is larger than the outer diameter of the finished rotor shaft in the area of the second axial end, the rod-like billet having an outer diameter that is smaller than an outer diameter of the flange.

9. The method according to claim 7, further comprising the step of austenizing the rotor shaft together with the flange after the integrally forging step.

10. The method according to claim 7, further comprising the step of machining the rotor shaft together with the flange after the integrally forging step.

11. The rotating-according to claim 2, wherein in each of the area of the first axial end and the area of the second axial end at least one antifriction bearing is provided and the rotor shaft forms a bearing inner ring of the antifriction bearings including an area on which rolling elements of the antifriction bearings roll; and a surface of the rotor shaft is hardened at least in the area on which rolling elements of the antifriction bearings roll.

12. The rotating-according to claim 3, wherein in each of the area of the first axial end and the area of the second axial end at least one antifriction bearing is provided and the rotor shaft forms a bearing inner ring of the antifriction bearings including an area on which rolling elements of the antifriction bearings roll; and a surface of the rotor shaft is hardened at least in the area on which rolling elements of the antifriction bearings roll.

13. The rotating-according to claim 2, wherein the rotor shaft is austenitized, or through-hardened by austenitizing in combination with quenching, at least in an inner core.

14. The rotating-according to claim 3, wherein the rotor shaft is austenitized, or through-hardened by austenitizing in combination with quenching, at least in an inner core.

15. The rotating-according to claim 4, wherein the rotor shaft is austenitized, or through-hardened by austenitizing in combination with quenching, at least in an inner core.

16. The method according to claim 8, further comprising the step of austenizing the rotor shaft together with the flange after the integrally forging step.

17. The method according to claim 8, further comprising the step of machining the rotor shaft together with the flange after the integrally forging step.

18. The combination of claim 6, wherein the anode disc is coupled to the flange of the rotor shaft.

19. The combination of claim 18, wherein the anode disc is coupled to the flange of the rotor shaft via the rotor, whereby the rotor is intermediate the flange of the rotor shaft and the anode disc.

20. The combination of claim 18, wherein the flange forms the anode disc.

\* \* \* \* \*